US011651764B2

(12) United States Patent
Yamashita et al.

(10) Patent No.: US 11,651,764 B2
(45) Date of Patent: May 16, 2023

(54) METHODS AND SYSTEMS FOR SYNTHESIZING SPEECH AUDIO

(71) Applicant: TOBROX COMPUTING LIMITED, Toronto (CA)

(72) Inventors: Mark Wayne Yamashita, Toronto (CA); Ryan John Keller, Toronto (CA); David William Nichols, Toronto (CA); Geoffrey Gordon Raffan, Toronto (CA)

(73) Assignee: Tobrox Computing Limited, Toronto (CA)

( * ) Notice: Subject to any disclaimer, the term of this patent is extended or adjusted under 35 U.S.C. 154(b) by 228 days.

(21) Appl. No.: 17/105,712

(22) Filed: Nov. 27, 2020

(65) Prior Publication Data

US 2022/0005460 A1 Jan. 6, 2022

Related U.S. Application Data

(60) Provisional application No. 63/047,408, filed on Jul. 2, 2020.

(51) Int. Cl.
*G10L 13/10* (2013.01)
*G06F 3/04842* (2022.01)

(52) U.S. Cl.
CPC .......... *G10L 13/10* (2013.01); *G06F 3/04842* (2013.01)

(58) Field of Classification Search
CPC ..... G10L 13/10; G10L 13/06; G06F 3/04842; G06F 40/00
See application file for complete search history.

(56) References Cited

U.S. PATENT DOCUMENTS

| | | | | |
|---|---|---|---|---|
| 4,773,009 | A * | 9/1988 | Kucera | G06F 40/253 715/260 |
| 10,453,434 | B1 * | 10/2019 | Byrd | G10L 25/18 |
| 10,885,902 | B1 * | 1/2021 | Papania-Davis | G10L 15/1815 |
| 2002/0198717 | A1 * | 12/2002 | Oudeyer | G10L 17/26 704/E13.004 |
| 2009/0022309 | A1 * | 1/2009 | Vanstone | G06F 40/151 380/28 |
| 2010/0162879 | A1 * | 7/2010 | Marcus | G10H 1/0025 84/609 |
| 2011/0093270 | A1 * | 4/2011 | Bhamidipati | G10L 21/04 704/E21.001 |

(Continued)

*Primary Examiner* — Fariba Sirjani
(74) *Attorney, Agent, or Firm* — Dickinson Wright LLP; Matthew D. Powell

(57) ABSTRACT

A computer-implemented method for synthesizing speech audio includes obtaining a grammatical profile defining an input text of actual words as a function of at least syllable-occurrence rates and syllable-count-per-word rates; generating a dictionary of pseudo-words having the syllable-count-per-word rates, each pseudo-word consisting of one syllable or concatenated syllables selected from the input text, wherein substantially all of the pseudo-words are not actual words; constructing an output text product having the grammatical profile, the output text product comprising at least one sentence consisting of one or more pseudo-words selected from the dictionary; and synthesizing speech audio using the output text product. Related systems and computer-readable media are also provided.

20 Claims, 10 Drawing Sheets

(56) References Cited

U.S. PATENT DOCUMENTS

| | | | | |
|---|---|---|---|---|
| 2011/0288861 | A1* | 11/2011 | Kurzweil | G09B 5/062 704/E15.044 |
| 2013/0166303 | A1* | 6/2013 | Chang | G06F 16/7834 707/723 |
| 2017/0154546 | A1* | 6/2017 | Butler | G10L 15/187 |
| 2019/0340949 | A1* | 11/2019 | Meisner | G09B 5/04 |

* cited by examiner

FIG. 10
THE INTERNATIONAL PHONETIC ALPHABET (revised to 2020)
CONSONANTS (PULMONIC)
2020 IPA
Bilabial
Labiodental
Dental
Alveolar
Postalveolar
Retroflex
Palatal
Velar
Uvular
Pharyngeal
Glottal
Plosive
Nasal
Trill
Tap or Flap
Fricative
Lateral fricative
Approximant
Lateral approximant
Symbols to the right in a cell are voiced, to the left are voiceless. Shaded areas denote articulations judged impossible.
CONSONANTS (NON-PULMONIC)
Clicks
Voiced implosives
Ejectives
Bilabial
Dental
Palatal
Velar
Uvular
Examples:
Alveolar fricative
VOWELS
Front
Central
Back
Close
Close-mid
Open-mid
Open
Where symbols appear in pairs, the one to the right represents a rounded vowel.
OTHER SYMBOLS
Voiceless labial-velar fricative
Voiced labial-velar approximant
Voiced labial-palatal approximant
Voiceless epiglottal fricative
Voiced epiglottal fricative
Epiglottal plosive
Alveolo-palatal fricatives
Voiced alveolar lateral flap
Simultaneous ʃ and x
Affricates and double articulations can be represented by two symbols joined by a tie bar if necessary.
SUPRASEGMENTALS
Primary stress
Secondary stress
Long
Half-long
Extra-short
Minor (foot) group
Major (intonation) group
Syllable break
Linking (absence of a break)
DIACRITICS
Voiceless
Voiced
Aspirated
More rounded
Less rounded
Advanced
Retracted
Centralized
Mid-centralized
Syllabic
Non-syllabic
Rhoticity
Breathy voiced
Creaky voiced
Linguolabial
Labialized
Palatalized
Velarized
Pharyngealized
Velarized or pharyngealized
Raised
Lowered
Advanced Tongue Root
Retracted Tongue Root
Dental
Apical
Laminal
Nasalized
Nasal release
Lateral release
No audible release
TONES AND WORD ACCENTS
LEVEL
CONTOUR
Extra high
High
Mid
Low
Extra low
Rising
Falling
High rising
Low rising
Rising-falling
Downstep
Upstep
Global rise
Global fall
Some diacritics may be placed above a symbol with a descender, e.g.

METHODS AND SYSTEMS FOR SYNTHESIZING SPEECH AUDIO

CROSS REFERENCE TO RELATED APPLICATION

This application claims priority to U.S. Provisional Patent Application Ser. No. 63/047,408 filed on Jul. 2, 2020 entitled "System And Method For Generation of Human Voice Audio Into Film And Television", the contents of which are incorporated herein by reference in their entirety.

FIELD OF THE INVENTION

The following relates generally to film and television production, and more particularly to methods and systems for synthesizing speech audio to be used as background audio for film and television productions.

BACKGROUND OF THE INVENTION

Background speech audio—known as walla—is an audio component that mimics the vocal murmur and background dialogue of crowds that people are accustomed to hearing as they go about in public. Incorporating walla into a film or television production can lend it a sense of realism; a production that is lacking walla can feel empty and unreal.

Walla is not generally recorded during filming, since at the filming stage the focus—where audio is concerned—is on cleanly capturing the audio of any foreground dialogue and other foreground sounds of the scene. As part of this, background performers appearing on film do not usually speak or make other vocal sounds. Rather, during filming, background performers merely mime their utterances.

For creating walla during post-production, it has traditionally been common to assemble a group of voice performers—generally known as a loop group—in a recording studio. The numbers of voice performers and the ratio of male-female voices in a given loop group or for a given scene will vary depending upon the needs of the project. Generally, voice performers in a loop group are directed by an Automated Dialogue Replacement (ADR) director and/or a sound editor. This person will instruct the loop group to, at certain times, make certain utterances or engage in conversations with each other in the desired language. One goal in producing walla is to provide background audio that provides an impression of a crowd's presence via conversations or other utterances, without drawing a listener's attention away from the foreground audio. As part of this, therefore, voice performers working as part of a loop group are instructed to speak in language-specific gibberish in order to convey rhythm, emotion and energy appropriate to the scene and to the language being used. Several audio recordings may be required to be layered together in order to capture appropriate walla, and to capture layers of walla to allow for stereo and surround sound placement of the voices from the loop group.

Different walla is required for different productions. For example, the rhythm, emotion and energy of walla appropriate for a lively bar scene will be different from that which is appropriate for observers of an intense tennis match. Furthermore, the rhythm of certain languages, dialects and eras is different from others, such that walla created for one scene can feel unnatural or inappropriate when used in another. Given this, it is generally felt that walla audio tracks should be uniquely created for each different scene rather than re-used for multiple different scenes or productions.

There has been a proliferation of reasonably priced equipment for video and audio capture, computer systems for storing and manipulating captured content, and broadcasting and streaming platforms for content distribution. In response, there has been an increase in demand for other tools that creators can deploy in conjunction with all of these components to efficiently create and integrate content into their productions. As effective as it can be to integrate custom walla, producing custom walla using human voice performers can be expensive and time-consuming. For example, one must generally factor the costs and time involved in finding and hiring voice performers, coordinating schedules, renting studio time, directing recording sessions, correcting or modifying recordings in response to director notes, and the like. Because of this, traditional methods of generating and refining high quality and appropriate walla are generally only financially viable for larger budget productions.

It is an object of the following description to address the disadvantages referred to above.

SUMMARY OF THE INVENTION

In accordance with an aspect, there is provided a computer-implemented method for synthesizing speech audio comprising: obtaining a grammatical profile defining an input text of actual words as a function of at least syllable-occurrence rates and syllable-count-per-word rates; generating a dictionary of pseudo-words having the syllable-count-per-word rates, each pseudo-word consisting of one syllable or concatenated syllables selected from the input text, wherein substantially all of the pseudo-words are not actual words; constructing an output text product having the grammatical profile, the output text product comprising at least one sentence consisting of one or more pseudo-words selected from the dictionary; and synthesizing speech audio using the output text product.

In an embodiment, constructing the output text product comprises: constructing multiple sentences each consisting of one or more pseudo-words selected from the dictionary.

In an embodiment, constructing multiple sentences further comprises: associating each of the multiple sentences with an intended one of a plurality of different speakers.

In an embodiment, the generating comprises: generating a potential pseudo-word using one or more syllables selected from the input text; comparing the potential pseudo-word with actual words in a set of actual words; in the event that the potential pseudo-word is determined to substantially match one or more of the actual words, discarding the potential pseudo-word; and otherwise: adding the potential pseudo-word to the dictionary.

In an embodiment, the grammatical profile comprises: a syllabic profile including the syllables, the syllable-occurrence rates and the syllable-count-per-word rates; and a structural profile defining the input text of actual words as a function of at least one of: word-count-per-sentence rates, sentence type occurrence rates, number of words per sentence, frequency of interjections, and distribution of word length by speaker.

In an embodiment, the syllable-occurrence rates include at least: a frequency of occurrence for each of a plurality of different syllables occurring in the input text.

In an embodiment, the syllable-count-per-word rates include at least: a frequency of monosyllabic words occurring in the input text, a frequency of bisyllabic words occurring in the input text, a frequency of trisyllabic words occurring in the input text, and a frequency of quadrisyllabic words occurring in the input text.

In an embodiment, the syllable-count-per-word rates comprise: for each of n=1 to x: a frequency of n-syllable words occurring in the input text; wherein x>1.

In an embodiment, the method further comprises: establishing x as a number of syllables in the highest-syllable count word occurring in the input text.

In an embodiment, the grammatical profile further defines average distributions of positions of n-syllable words within sentences in the input text.

In an embodiment, the input text comprises at least one film/television script.

In an embodiment, the method further comprises: processing the input text to generate the syllabic profile and the structural profile.

In an embodiment, the method further comprises: causing user-selectable prosody to manifest in the speech audio.

In an embodiment, the user-selectable prosody is one or more of the characteristics selected from the group consisting of: energy, complexity, muting, volume, injection, speak over, grit, pitch, intonation, rhythm, and tempo.

In an embodiment, causing user-selectable prosody to manifest in the speech audio comprises: associating at least one selected prosody characteristic with one or more of the pseudo-words.

In an embodiment, causing user-selectable prosody to manifest in the speech audio comprises: during the synthesizing, providing at least one selected prosody characteristic and the output text product to a text-to-speech process.

In an embodiment, causing user-selectable prosody to manifest in the speech audio comprises: after the synthesizing, modifying the speech audio in accordance with at least one selected prosody characteristic.

In an embodiment, the method further comprises: generating and displaying user interface elements enabling a user to select the user-selectable prosody.

According to another aspect, there is provided a non-transitory computer-readable medium embodying a computer program executable on a computer processor for synthesizing walla, the computer program comprising: computer program code for obtaining a grammatical profile defining an input text as a function of at least syllable-occurrence rates and syllable-count-per-word rates; computer program code for generating a dictionary of pseudo-words having the syllable-count-per-word rates, each pseudo-word consisting of one syllable or concatenated syllables selected from the input text, wherein substantially all of the pseudo-words are not actual words; computer program code for constructing an output text product having the grammatical profile, the output text product comprising at least one sentence consisting of one or more pseudo-words selected from the dictionary; and computer program code for synthesizing speech audio using the output text product.

According to another aspect, there is provided a system for synthesizing walla, the system comprising at least one computer processor configured to: obtain a grammatical profile defining an input text as a function of at least syllable-occurrence rates and syllable-count-per-word rates; generate a dictionary of pseudo-words having the syllable-count-per-word rates, each pseudo-word consisting of one syllable or concatenated syllables selected from the input text, wherein substantially all of the pseudo-words are not actual words; construct an output text product having the grammatical profile, the output text product comprising at least one sentence consisting of one or more pseudo-words selected from the dictionary; and synthesize speech audio using the output text product.

Other aspects and advantages will be apparent upon reading the following.

BRIEF DESCRIPTION OF THE DRAWINGS

Embodiments of the invention will now be described with reference to the appended drawings in which.

DETAILED DESCRIPTION

According to the present description, background speech audio deployable as walla is synthesized based on an output text product that has been constructed using pseudo-words formed from syllables in an input text and arranged in the output text product according to a grammatical profile of the input text. In some embodiments, the output text product corresponds to both a syllabic profile and a structural profile of the input text, while being substantially free of actual words. The resulting synthesized speech audio is intended to be perceivable by listeners as sounding much like what speakers uttering the input text would sound like in terms of syllabic content, distribution, and sentence rhythm. However, the synthesized speech audio is substantially free of any words that would be recognizable as such by the listener. In this sense, the present description may be thought of as providing technical approaches to filtering original semantic meaning out of an input text while retaining at least some of the input text's syllabic and structural aspects. These retained aspects are used as the basis upon which to generate an output text product from which speech audio appropriate for walla can be synthesized.

In embodiments, user-selected prosody can be made manifest in the synthesized speech audio. This can be done by imbuing the synthesized speech audio with one or more user-adjustable prosody characteristics thereby to provide a user with additional control over the quality of the speech audio for deployment as wall in various scenarios. Such prosody characteristics may be applied to the output text product, may be used as inputs to a text-to-speech process, or may be applied to the synthesized speech audio. Such prosody characteristics may include characteristics selected from the group consisting of: energy, complexity, muting, volume, injection, speak over, grit, pitch, intonation, rhythm, and tempo, as will be described in further detail below.

Figure 1:
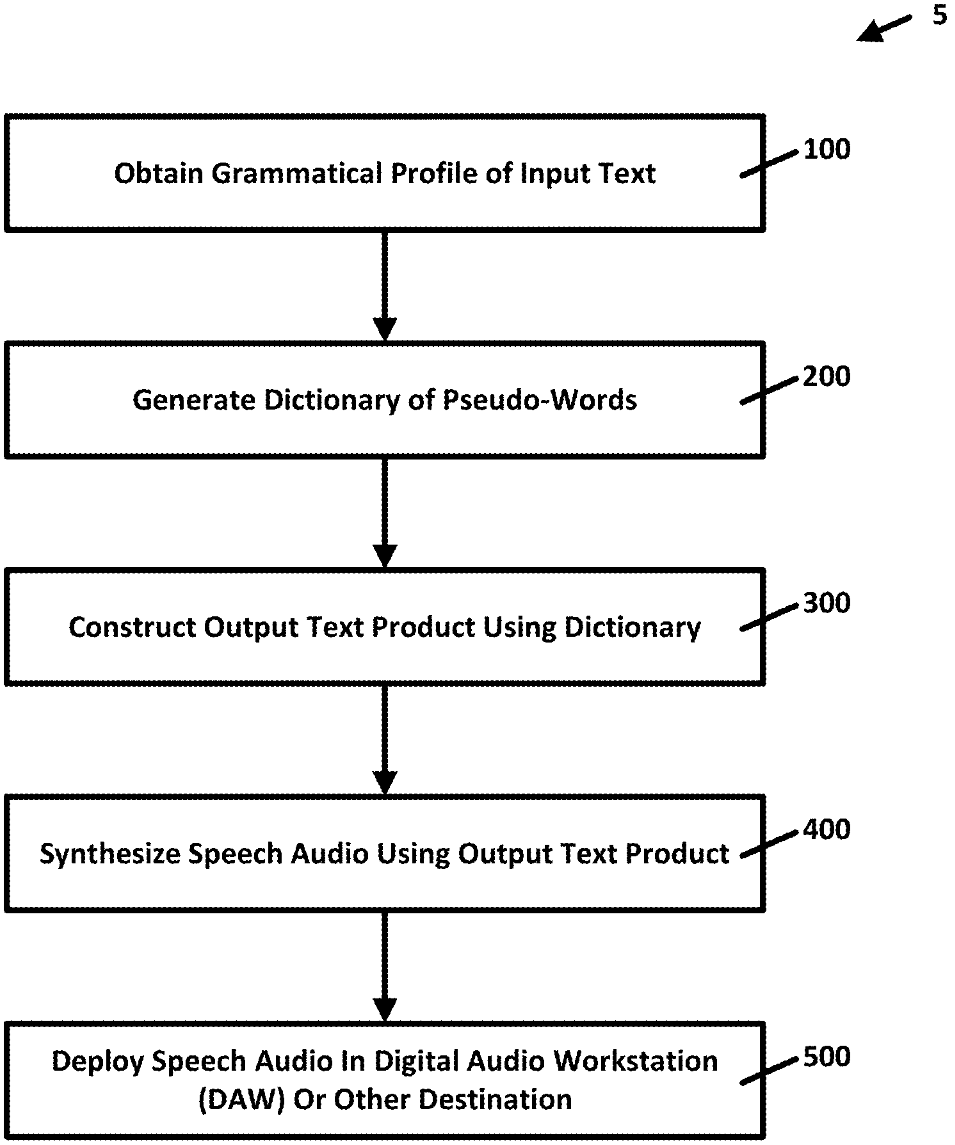
FIG. 1 is a flowchart depicting steps in a method for synthesizing speech audio, according to an embodiment.

FIG. 1 is a flowchart depicting steps in a method 5 for synthesizing speech audio, according to an embodiment. During the method, a grammatical profile of input text is obtained (step 100), and a dictionary of pseudo-words is generated (step 200). With the dictionary of pseudo-words having been generated, an output text product is constructed according to the grammatical profile using the dictionary (step 300). Using the output text product, speech audio is synthesized (step 400), and the synthesized speech audio is thereafter deployed for use in a digital audio workstation or other destination (step 500).

The grammatical profile obtained during step 100 may itself have been established prior to the synthesizing of the speech audio, such that it could be obtained from (for example) a library of different grammatical profiles of different respective input texts. Alternatively, the grammatical profile obtained during step 100 may be generated anew based on an input text provided, for example, by a user intending to synthesize the speech audio using his/her own input text.

In this description, a grammatical profile of input text includes a number of measurements that have been gleaned from an automatic textual analysis of the input text. Broadly-speaking, in this embodiment, the grammatical profile includes a syllabic profile containing syllabic profile components, and a structural profile containing structural profile components.

In this embodiment, components of the syllabic profile pertain to which syllables occur within the input text and how many syllables are used as, or combined for, words. The syllabic profile includes syllables of the input text themselves, the frequencies at which each individual syllable occurs in the input text (the syllable-occurrence rates), and the rate at which n-syllable words occur in the text (the syllable-count-per-word rates). More or fewer components may be included in the syllabic profile.

In this embodiment, for example, the syllable-occurrence rates component can be stored in a simple table data structure, as shown in Table 1 below.

TABLE 1

| SYLLABLE | FREQUENCY |
| --- | --- |
| 'ænd | 0.0032 |
| 'fɔr | 0.0030 |
| ʃə n | 0.0022 |
| . . . | . . . |
| SUM TOTAL | 1.00 |

Figure 10:
FIG. 10 depicts a schema of the International Phonetic Alphabet.

It will be appreciated that the syllables in Table 1 are depicted in terms of their phonetic representations according to the International Phonetic Alphabet, a schema for which is shown in FIG. 10.

As for the syllable-count-per-word rates, for a language such as English, these may include at least: a frequency of monosyllabic words occurring in the input text, a frequency of bisyllabic words occurring in the input text, a frequency of trisyllabic words occurring in the input text, and a frequency of quadrisyllabic words occurring in the input text. More or fewer syllable count words and their rates may be available as part of the syllabic profile for a given input text.

In this embodiment, for example, the syllable-count-per-word rates component is the representation of word lengths in terms of an integer number of syllables and the frequency with which they appear in the input text. This component can be stored in a simple table data structure, as shown in Table 2 below.

TABLE 2

| WORD LENGTH (SYLLABLES) | FREQUENCY |
| --- | --- |
| 1 | 0.32 |
| 2 | 0.45 |
| 3 | 0.12 |
| . . . | . . . |
| SUM TOTAL | 1.00 |

Each frequency is a rational number generated from the analysis of the input text, and the frequencies sum to 1.00, representing 100% of the different word lengths in the input text.

In this embodiment, the syllabic profile portion of the grammatical profile also includes a component establishing the average distributions of the positions of n-syllable words within sentences of the input text. This component is for codifying trends arising in the input text whereby certain length words—those with a particular number of syllables—are typically clustered more often at the beginning, middle or ends of sentences. For example, in a given input text for a given language, monosyllabic words may tend to arise more often at the beginning of sentences, whereas quadrasyllabic words in the same input text may tend to arise only in the middle of sentences. The average distributions of the positions of n-syllable words within sentences can be used to inform the downstream construction of sentences in the output text product using the dictionary.

In this embodiment, components of the structural profile of the input text components are those pertaining to word-count-per-sentence rates, sentence type occurrence rates, number of words per sentence, frequency of interjections, and distribution of word length by speaker. More or fewer components may be included in the structural profile.

In this embodiment, for example, the word-count-per-sentence rates component is the representation of sentence lengths in terms of an integer number of words and the frequency with which the sentences of such lengths appear in the input text. This component can be stored in a simple table data structure, as shown in Table 3 below.

TABLE 3

| SENTENCE LENGTH (WORDS) | FREQUENCY |
| --- | --- |
| 1 | 0.00 |
| 2 | 0.01 |
| 3 | 0.03 |
| 4 | 0.23 |
| 5 | 0.44 |
| 6 | 0.22 |
| . . . | . . . |
| SUM TOTAL | 1.00 |

Each frequency is a rational number generated from the analysis of the input text, and the frequencies sum to 1.00, representing 100% of the different sentence lengths in the input text.

Figure 2:
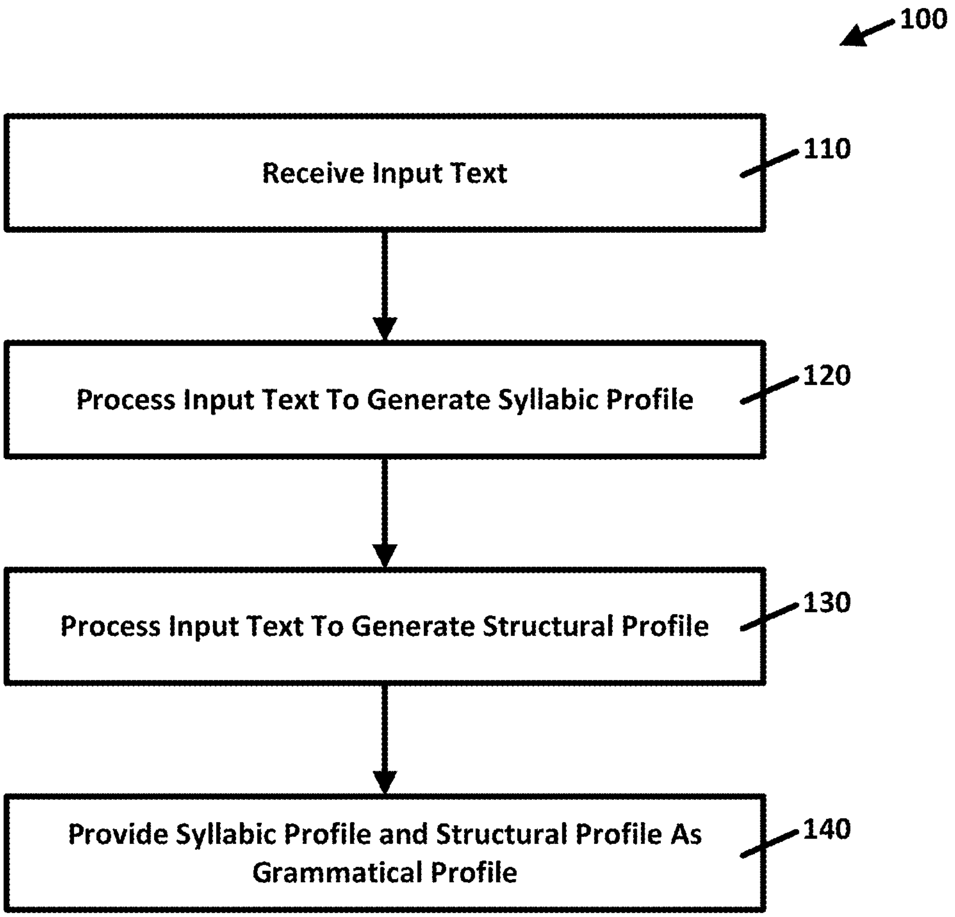
FIG. 2 is a flowchart depicting steps for obtaining a grammatical profile of input text, according to an embodiment.

FIG. 2 is a flowchart depicting steps for generating a grammatical profile of an input text (step 100), according to an embodiment. During generating of the grammatical profile, input text is received (step 110). Such an input text may be a script (or a number of scripts) appropriate for a film production, a television production, a stage play, or the like. The input text may be in the form of standard human-readable word and sentences structures in a particular language, with the words and sentences optionally associated in some way with a particular speaker. The input text may alternatively be in a different form such as a conversion from standard commonly-readable word and sentence structures into a phonetic alphabet-based representation (such as is shown in the schema of FIG. 10), or even a Unicode representation. Technically, the input text may be provided in the form of one or more computer-readable data files in a flat text format or one or more computer-readable data files formatted using a markup language. The input text is processed to generate the syllabic profile (step 120) and processed to generate the structural profile (130). The components of the syllabic profile and of the structural profile are stored in appropriate electronic data structures for downstream retrieval during the steps of generating the dictionary (step 200) and constructing the output text (step 300).

During generating of the syllabic profile (step 120), it may be determined that (for example) there are no quadrisyllabic words occurring in the input text, such that the resulting syllable-count-per-word rate for four-syllable words would be measured at zero (0). As such, as a general principal, during the analysis of the input text to generate the syllabic profile, the syllable-count-per word rates will include a frequency of n-syllable words occurring in the input text for each of n=1 to x, where x is >1, to account for at least monosyllabic as distinguished from bisyllabic words. In embodiments, x is configurable and may be calculated automatically. For example, as it may not be particularly helpful to establish x as high as ten (10) when there would be a vanishingly small likelihood that a given input text would contain any words having any more than, for example, five (5) syllables. Therefore, in an embodiment, x can automatically be established as the number of syllables in the highest-syllable count word determined during analysis to have occurred in the input text. In this way, none of the calculated rates would be exactly zero (0).

As an example of a structural profile component being measured during generating of the structural profile (step 130), interjections and speakovers within the input text can be detected in various ways so that the frequency of interjections and/or speakovers in the input text can be calculated. Below are example portions of close-captioned script portions usable as input text.

A first sample script portion is shown below.

Sample Script Portion 1 (Subtitles; Romeo & Juliet)

1
00:00:35,827 --> 00:00:38,819
Gregory, o' my word, we'll not carry coals
2
00:00:40,040 --> 00:00:41,211
No, for then we should be colliers.

-continued

Sample Script Portion 1 (Subtitles; Romeo & Juliet)

3
00:00:41,291 --> 00:00:42,998
I mean, an we be in choler, we'll draw.
4
00:00:43,669 --> 00:00:45,285
Ay, while you live, draw your neck out
o' the collar.
5
00:00:45,379 --> 00:00:46,710
I strike quickly, being moved.
6
00:00:46,797 --> 00:00:48,583
But thou art not quickly moved to strike.
7
00:00:48,882 --> 00:00:51,089
A dog of the house of Montague moves me.
8
00:00:52,260 --> 00:00:54,251
To move is to stir; and to be valiant is to
stand: therefore, if thou art moved, thou runn'st away.
9
00:00:54,763 --> 00:00:57,346
A dog of that house shall move me to stand:
I will take the wall of any man or maid of Montague's.
10
00:00:57,432 --> 00:00:59,343
That shows thee a weak slave; for the weakest
goes to the wall.
11
00:00:59,559 --> 00:01:02,051
True; and therefore women, being the
weaker vessels, are ever thrust to the wall: therefore I
will push Montague's men from the wall, and thrust his
maids to the wall.
12
00:01:02,145 --> 00:01:04,637
The quarrel is between our masters and us
their men.
13
00:01:04,731 --> 00:01:07,894
Tis all one, I will show myself a tyrant: when
I have fought with the men, I will be cruel with the
maids, and cut off their heads.
14
00:01:08,068 --> 00:01:10,901
The heads of the maids?
15
00:01:10,987 --> 00:01:13,228
Ay, the heads of the maids, or their
maidenheads; take it in what sense thou wilt.
16
00:01:13,323 --> 00:01:15,064
They must take it in sense that feel it.
17
00:01:15,158 --> 00:01:18,276
Me they shall feel while I am able to stand:
and'tis known I am a pretty piece of flesh.
18
00:01:18,370 --> 00:01:20,987
'Tis well thou art not fish; if thou hadst, thou
hadst been poor John. Draw thy tool! here comes
two of the house of the Montagues
19
00:01:21,081 --> 00:01:22,571
My naked weapon is out: quarrel,
I will back thee.
20
00:01:22,666 --> 00:01:24,452
How! turn thy back and run?
21
00:01:24,543 --> 00:01:26,784
Fear me not.
22
00:01:28,004 --> 00:01:29,586
No, marry; I fear thee!

-continued

Sample Script Portion 1 (Subtitles; Romeo & Juliet)

23
00:01:29,673 --> 00:01:31,755
Let us take the law of our sides;
let them begin.
24
00:01:31,842 --> 00:01:34,459
I will frown as I pass by, and let them take it
as they list.
25
00:01:34,553 --> 00:01:37,215
Nay, as they dare. I will bite my thumb at
them; which is a disgrace to them, if they bear it.
26
00:01:37,305 --> 00:01:38,340
Do you bite your thumb at us, sir?
27
00:01:38,598 --> 00:01:41,807
I do bite my thumb, sir.
28
00:01:41,893 --> 00:01:44,635
Do you bite your thumb at us, sir?
29
00:01:44,730 --> 00:01:47,768
Is the law of our side,
if I say ay?
30
00:01:47,941 --> 00:01:49,941
No.
31
00:01:50,193 --> 00:01:52,776
No, sir, I do not bite my thumb at you, sir,
but I bite my thumb, sir.
32
00:01:52,904 --> 00:01:53,894
Do you quarrel, sir?

-continued

Sample Script Portion 1 (Subtitles; Romeo & Juliet)

33
00:01:54,156 --> 00:01:56,989
Quarrel sir! no, sir.
34
00:01:57,159 --> 00:01:59,275
If you do, sir, I am for you: I serve as good a
man as you.
35
00:01:59,494 --> 00:02:01,986
No better.
36
00:02:02,080 --> 00:02:04,242
Well, sir.
37
00:02:04,332 --> 00:02:05,663
Say "better": here comes one of my
master's kinsmen.
38
00:02:05,792 --> 00:02:07,547
Yes, better, sir.
39
00:02:07,627 --> 00:02:11,666
You lie.
40
00:02:12,048 --> 00:02:15,166
Draw, if you be men. Gregory, remember thy
swashing blow.
41
00:02:15,469 --> 00:02:18,006
Part, fools!
Put up your swords; you know not what you do.

A second sample script portion is shown below.

Sample Script Portion 2 (Subtitles; The Marriage)

1
00:01:00,478 --> 00:01:03,478
My dear Ivan Vassilevitch! I am extremely glad to see you here!
2
00:02:05,709 --> 00:02:07,710
Now this is a surprise, dear boy... How are you and so on and all
that?
3
00:02:10,914 --> 00:02:14,617
I'm well thank you. And how are you getting on?
4
00:02:18,021 --> 00:02:19,556
We're just getting by somehow, thanks to your prayers, and so on. Sit
down, please do....
5
00:02:23,492 --> 00:02:25,694
Now, you know, you shouldn't forget all about your dear neighbours.
But why are you so formal? What's the occasion?
6
00:02:29,633 --> 00:02:30,867
Why the evening dress, gloves, and so
on and all that. Are you going somewhere?
7
00:02:55,759 --> 00:02:58,694
No, I've come only to see you, honoured Stepan Stepanovitch.
8
00:02:58,728 --> 00:03:01,132
Then why are you in evening dress, my boy? It's as if you're celebrating
New Year's Eve !
9
00:03:01,164 --> 00:03:03,633
Well, you see, it's like this. I'm sorry to trouble you .... I've come to you,
honoured Stepan Stepanovitch...with a request.
10
00:03:03,667 --> 00:03:07,469
It's not the first time I have had the
privilege of coming to you for help, and you have always...., so to speak... I beg your
pardon, I am very nervous.

-continued

| Sample Script Portion 2 (Subtitles; The Marriage) |
|---|

11
00:03:29,558 --> 00:03:31,127
If you don't mind I'll drink some water, honoured Stepan
Stepanovitch.
12
00:03:31,162 --> 00:03:33,030
If he's come to borrow money, he'll be sorely disappointed!
13
00:03:33,063 --> 00:03:35,932
What is it, my dear friend?
14
00:03:35,966 --> 00:03:38,134
You see, Honour Stepanitch... I mean, Stepan Honouritch...pardon me, I'm
shaking with nerves, as you can see....
15
00:03:38,168 --> 00:03:39,703
In short, you alone can help me, though I don't
deserve it, of course...
16
00:03:39,735 --> 00:03:41,204
and I haven't any right to expect your assistance....
17
00:03:41,237 --> 00:03:43,539
Oh, don't beat around the bush boy! Spit it out and so on! Well?
18
00:03:43,573 --> 00:03:44,942
One minute!
19
00:03:47,912 --> 00:03:50,479
The fact is.... I've come to ask for the hand of
your daughter, Natalya Stepanovna, in marriage.
20
00:03:52,283 --> 00:03:54,516
Oh dear God in heaven! Ivan Vassilevitch! Such joy! ... Can you say
that again I'm not sure I heard all that and so on?
21
00:03:54,550 --> 00:03:55,920
I have the honour to ask...
22
00:03:59,055 --> 00:04:01,792
Oh my dear boy... I'm so glad, and so on.... Yes, indeed, and all that sort
of thing.
23
00:04:14,872 --> 00:04:18,009
I've been hoping for this for a long time. You
have always been like a son to me. God bless you both and so on and all that. Look at
me, I'm blabbering like an idiot! Such happiness! Oh, you
rascal! ... I'll go and call Natasha, and all that.
24
00:04:18,042 --> 00:04:20,576
Honoured Stepan Stepanovitch, do you think I may count on
her consent?
25
00:04:20,610 --> 00:04:22,913
Why, of course she'll consent! She's in love... she's like a cat in heat..
..and so on.... I won't be long!
26
00:04:22,947 --> 00:04:24,981
Well, hello there! It's only you! Papa said,
27
00:04:29,252 --> 00:04:31,088
"Go inside there's a merchant come by to collect his goods." How have you been, Ivan Vassilevitch?
28
00:04:31,122 --> 00:04:33,290
I've been well, honoured Natalya Stepanovna.
29
00:04:33,324 --> 00:04:34,723
You must excuse my apron ... we're shelling peas for
drying. Why haven't you been here for such a long time? Please sit down.
30
00:04:38,829 --> 00:04:40,997
Won't you have some lunch?
31
00:04:41,031 --> 00:04:42,966
No, thank you, I've had some already -continued

| Sample Script Portion 2 (Subtitles; The Marriage) |
| --- |
| 32<br>00:04:43,000 --> 00:04:44,034<br>Please smoke if you like. The weather is glorious now,<br>but yesterday it was so wet that the field hands couldn't do anything all day.<br>33<br>00:04:46,836 --> 00:04:49,906<br>How much hay have you stacked? Actually, I got a bit enthusiastic today and had a whole field cut,<br>and now I'm regretting it because I'm afraid the hay may rot.<br>34<br>00:04:49,939 --> 00:04:51,942<br>Should I have waited a bit? Yes ,I ought to have waited a bit.<br>35<br>00:04:51,975 --> 00:04:54,744<br>But look at you! Why, you're in evening dress! Well<br>you do look nice! Are you going to a party or something? Tell me!<br>36<br>00:04:56,880 --> 00:04:58,081<br>You see, honoured Natalya Stepanovna... the fact is, I've come here<br>to see if you would....to ask you to .... hear me out....<br>37<br>00:04:58,115 --> 00:04:59,917<br>Of course you'll be surprised and<br>perhaps even a bit angry, but I... (Aside) It's really cold!<br>38<br>00:04:59,949 --> 00:05:01,951<br>What's the matter? Well?<br>39<br>00:05:01,985 --> 00:05:03,788<br>I shall try to be brief. You must know, honoured Natalya Stepanovna, that I<br>have long, since my childhood, in fact, had the privilege of knowing your family.<br>40<br>00:05:03,821 --> 00:05:05,622<br>My late aunt and her husband, from whom, as you know, I inherited my land, always had the<br>greatest respect for your father and your late mother.<br>41<br>00:05:05,654 --> 00:05:07,992<br>The Lomovs and the Chubukovs have always had the friendliest, and I might almost say the most<br>affectionate, regard for<br>each other.<br>42<br>00:05:08,024 --> 00:05:10,961<br>We are close neighbours.Of course you already know this! My land boarders<br>yours! My Oxen Meadows touch your birchwoods and....<br>43<br>00:05:10,995 --> 00:05:13,129<br>One moment, please forgive the interruption, but you said,<br>"My Oxen Meadows...." But are they yours?<br>44<br>00:05:18,235 --> 00:05:19,803<br>Yes, they are mine<br>45<br>00:05:23,173 --> 00:05:26,276<br>What are you talking about? Oxen Meadows are ours, not yours!<br>46<br>00:05:28,644 --> 00:05:31,281<br>No mine, honoured Natalya Stepanovna.<br>47<br>00:05:31,314 --> 00:05:33,750<br>Well, I never knew that before. How do you make that<br>out?<br>48<br>00:05:53,937 --> 00:05:55,105<br>How? I'm taking about the Oxen Meadows, on that tiny patch of land wedged<br>in between your birchwoods and the Burnt Marsh....<br>49<br>00:05:56,807 --> 00:05:58,808<br>.......and the Burnt Marsh.... ahh yes, yes.... No they're<br>ours.<br>50<br>00:06:00,076 --> 00:06:03,247<br>No, you're mistaken, honoured Natalya Stepanovna, they're mine. |

As can be seen, each of these close-captioned script portions contains time-stamped sentences representing dialogue. Given this, that detection of interjections and speakovers can be done by detecting when a time span of one sentence overlaps that of another time sentence.

For example, in the third and fourth sentences of Sample Script Portion 1, above, Speaker 2 begins speaking the second sentence 329 milliseconds (ms) before Speaker 1 is finished speaking the first sentence. This is an example of what might be interpreted as an interjection, as opposed to a speakover. While speakover and interjection are similar concepts, speakover differs from interjection in that speakover tends not to result in the first speaker stopping speaking, whereas interjection does tend to result in the first speaker stopping speaking. As such, with time-stamped dialogue, speakover may be distinguished mathematically by determining how long the first and second sentences overlap, or the proportion of the duration of the first sentence during which there was overlap. As for the latter measurement, if the overlap is found to be relatively short, then it may be deemed that an interjection had happened because the first sentence had ended relatively shortly after the second sentence had begun. On the other hand, if the overlap is found to be relatively long in duration, then it may be deemed than a speakover had happened because the first sentence had not ended shortly after the second sentence had begun. Calibrating the difference between interjections and speakovers may be a matter of preference and may be different for different languages, dialects, and eras.

By determining the number of interjections by counting the injection overlaps, the frequency of interjections per sentence can then be calculated by dividing the number of interjections by the number of sentences in the input text. This frequency number, which would be a rational value between 0 and 1 representing the probability of injection, can then be stored along with other structural profile components for downstream use.

Similarly, by determining the number of speakovers by counting the speakover overlaps, the frequency of speakovers per sentence can then be calculated by dividing the number of speakovers by the number of sentences in the input text. This frequency number, which would be a rational value between 0 and 1 representing the probability of speakover, can then be stored along with other structural profile components for downstream use.

In this embodiment, the sentence type occurrence rates component is the representation of sentence types in terms of one of a set number of sentence types and the frequency with which the sentences types appear in the input text. This component can be stored in a simple table data structure, as shown in Table 4 below containing three (3) sentence types. More or fewer sentence types may be determined and their respective frequencies stored.

TABLE 4

| SENTENCE TYPE | FREQUENCY |
|---|---|
| Statement | 0.63 |
| Question | 0.22 |
| Exclamation | 0.15 |
| SUM TOTAL | 1.00 |

Other approaches for detecting interjections or speakover may be used where dialogue in input text is not time stamped. For example, an valid and useful input text might be a book, a screenplay, a play, a transcript, or some other text source, which input texts do not typically include time stamps. As such, where information about frequency of interjections and/or speakover is desired as a component of the structural profile, methods by which interjections and speakover are detected might use natural language processing (NLP) via statistical analysis, language-specific linguistic rules, or models trained using machine learning to classify and provide analysis of various input texts.

In a given implementation, steps 110 and 120 are not required to be done in any particular sequence with respect to each other. Furthermore, the syllabic profile components and structural profile components once gleaned from the input text are not required to be stored separately in respective data structures in electronic memory. Certain syllabic profile components may be derivable from measured syllabic or structural profile components, and certain structural profile components may be derivable from measured structural or syllabic components. In certain implementations, it may be elected to not store such derivable profile components in the same manner as measured profile components, but instead to calculate them at the time the dictionary of pseudo words is being generated. Variations are possible.

With the input text having been processed to generate the syllabic profile and the structural profile, these are made available collectively as the grammatical profile.

Figure 3:
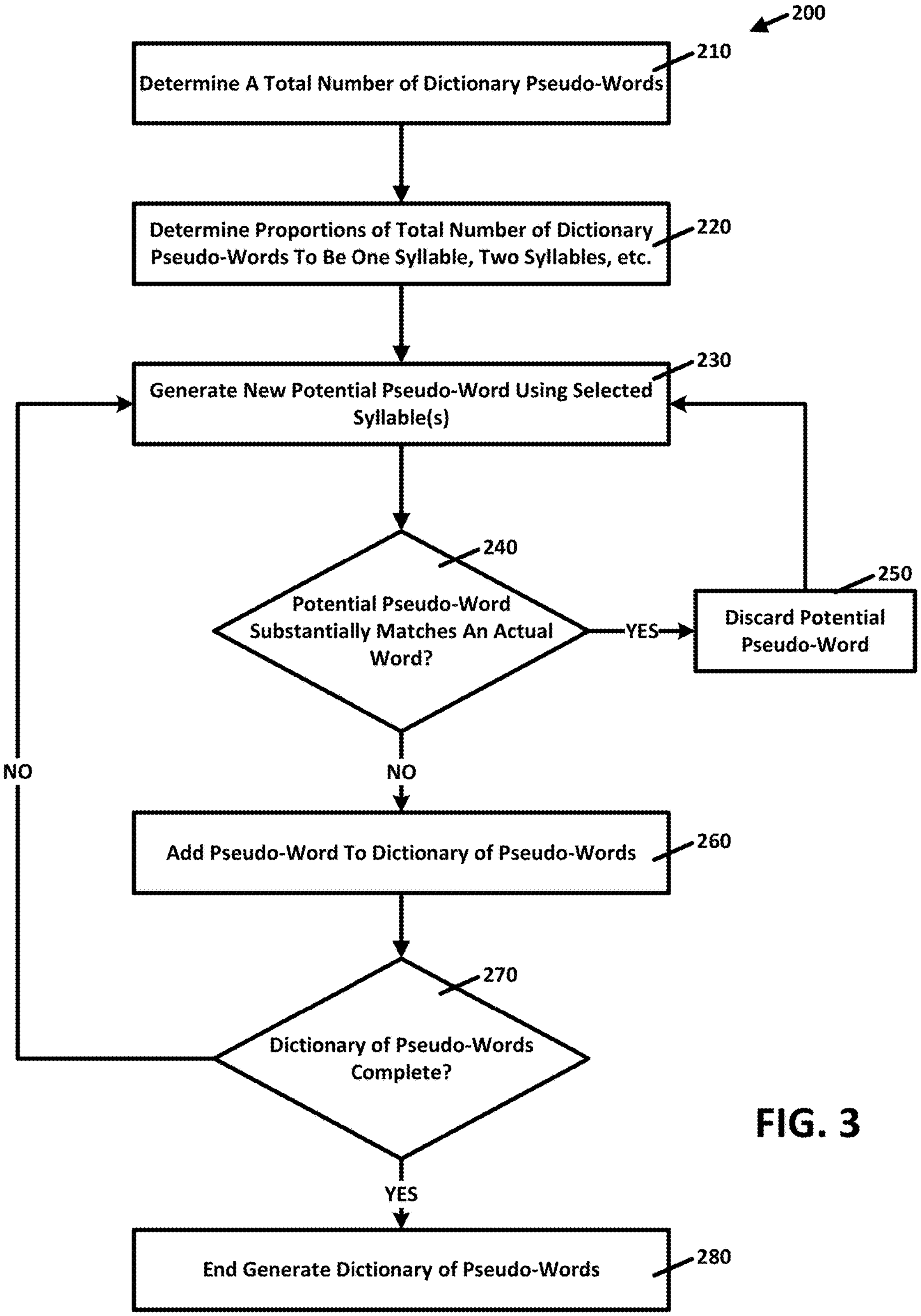
FIG. 3 is a flowchart depicting steps for generating a dictionary of pseudo-words, according to an embodiment.

FIG. 3 is a flowchart depicting steps for generating a dictionary of pseudo-words (step 200), according to an embodiment. With the syllabic profile components and the structural profile components of the grammatical profile having been obtained, a total number of dictionary pseudo-words is determined (step 210) and the proportions of the total number of dictionary pseudo-words to be one-syllable, two-syllables, three-syllables, etc. is determined (step 220). In this embodiment, the proportions are established for the dictionary by the syllable-count-per-word rates component of the syllabic profile of the overall grammatical profile of the input text. For example, if the syllable-count-per-word rates of the input text were as shown in Table 2, above, then these would be the syllable-count-per-word rates of the dictionary of pseudo-words to be generated. To use the rates of Table 2 as an example, were it determined to generate 1000 pseudo-words for the dictionary, 320 of these would be monosyllabic, 450 of these would be bisyllabic, 120 of these would be trisyllabic, and the remainder would be quadrisyllabic and/or longer.

With the number of pseudo-words of each syllable count having been determined, a new potential pseudo-word is generated using syllables selected from the input text (step 230). Such syllables are available as part of the syllabic profile, as represented in Table 1, above. It will be appreciated that the syllables maintained as part of the syllabic profile that are available for selection at the dictionary generating step may not be all of the syllables that were present in the input text. It may be that only key syllables—the top most frequently appearing syllables in the input text—are available for selection at this step. For example, if during generating of the syllabic profile it was found that a particular syllable only appeared once in an input text having 10,000 syllables, its significant rarity would position it as an outlier such that it would not need to be included in the syllable list of the syllabic profile for the input text.

In this embodiment, for the sake of the aims of producing walla, substantially all of the pseudo-words are not to be the same as, or too similar to, actual words. As such, each potential pseudo-word generated in step 230 is checked against a list of actual words to determine whether the generated pseudo-word substantially matches an actual word (step 240). The list of actual words may be all words of the appropriate language, or the most common words of the language. In the event that the pseudo-word substantially matches an actual word, the potential pseudo-word is discarded (step 250) and the process resumes at step 230 to generate a new potential pseudo-word (step 230). Otherwise, the generated potential pseudo-word is added to the dictionary (step 260). This process continues as long as it is determined that the dictionary is not complete (step 270) by generating new pseudo-words (step 230) and determining whether they match an actual word (step 240). The dictionary is complete when the number of pseudo-words added to the dictionary reaches the total number determined at step 210. Once this occurs, the process of generating the dictionary of pseudo-words ends (step 280).

Figure 4:
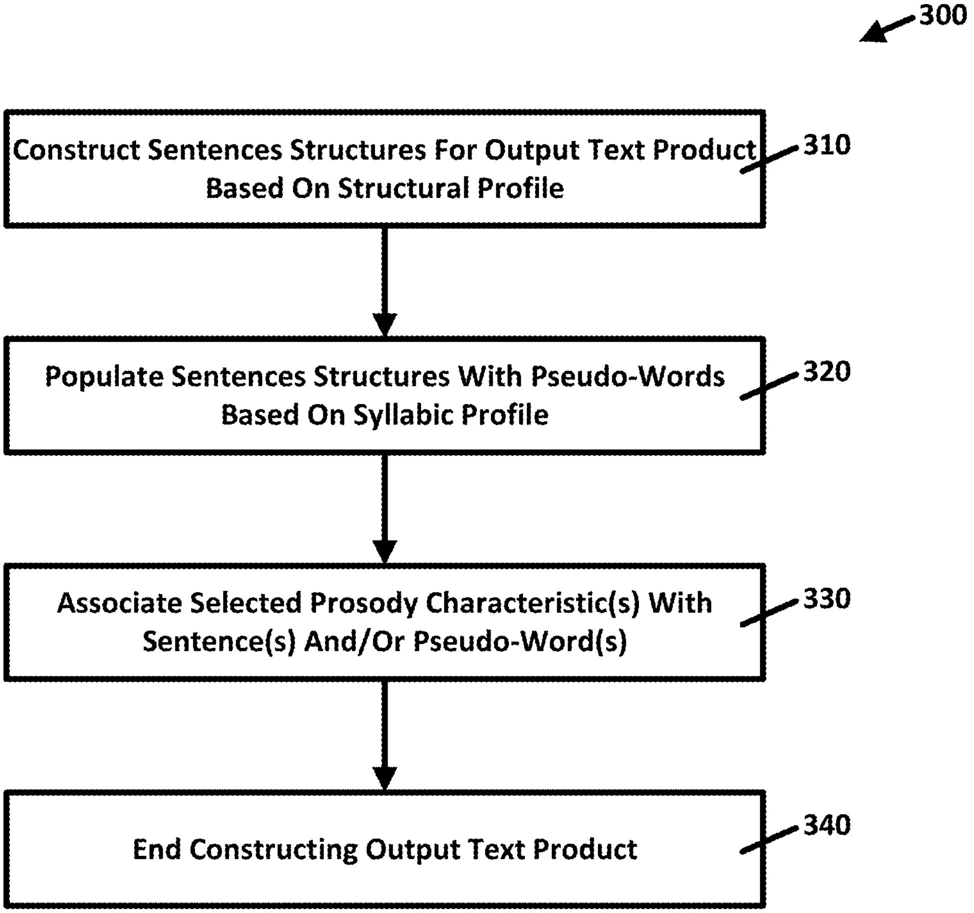
FIG. 4 is a flowchart depicting steps for constructing an output text product using the dictionary of pseudo-words, according to an embodiment.

FIG. 4 is a flowchart depicting steps for constructing an output text product using the dictionary of pseudo-words (step 300), according to an embodiment. With the dictionary of pseudo-words having been generated, sentence structures for the output text product are constructed based on the structural profile (step 310). The sentence structures are constructed as sequences of word placeholders that pseudo-words can be made to subsequently populate, as will be described. As such, the sentence structures are constructed such that the output text product will have the structural profile of the input text, and this is done by constructing numbers, sizes and types of sentence structures according to probabilities informed by the structural profile components obtained with the grammatical profile. With the sentence structures having been constructed, the sequences of word placeholders are then populated by pseudo-words from the dictionary of pseudo-words (step 320). This is done so that the overall output text product has a syllable-occurrence rate corresponding to that codified as a component in the syllabic profile of the grammatical profile of the input text. In this way, with the output text product having both a syllabic profile and a structural profile corresponding to that of the input text, while being substantially free of actual words. Certain selected prosody characteristics are then applied by associating sentences and/or pseudo words with the prosody characteristics (step 330). One or more user adjusted prosody characteristics may be inserted, once selected by the user, as markup tags in the output text product. Certain prosody characteristics can be stored as structural profile components detected and measured in the input text with respect to time, such as interjections or speakovers as described above. These stored structural components can inform the insertion of markup tags in the output text product to be associated with pseudo-word or sentences of the output text product and used for synthesis of the speech audio by the text-to-speech process. The ability to provide such instructions by way of text markup or other means to a text-to-speech process will depend on the capabilities of the particular text-to-speech processor being engaged. Generally speaking, the generating of the output text product takes into account the prosody characteristics of energy, complexity, injection and speak-over, as will be described. Energy refers to a measure of the 'liveliness' of the speakers. For example, higher energy produces greater outbursts or syllables that are accentuated. Energy models the perceived excitement within a conversation. Each speaker can be defined by a number of characteristics, such as how frequently they speak over other speakers or how often they inject into a conversation. The energy profile of a conversation acts as a multiplier on top of each speaker and affects each of the individual prosody characteristics of that speaker. After a speaker has been defined, the conversation's energy can be set. Complexity refers to a measure of the range of syllables used in the conversation. For example, a high complexity conversation will have a wider breadth of syllables making the conversation sound more intelligent. Injection refers to a measure of how often a speaker will interject another speaker to provide affirmations. For example, in English, a person with high Interjection will say 'yes', 'mm-hmm', 'ah-huh' a lot. Speak Over refers to the amount of overlap between speakers. For example, a high Speak Over indicates that individuals are prone to begin speaking their sentence before another speaker concludes theirs.

With these particular prosody characteristics having been applied, construction of the output text product is ended (step 340).

Figure 5:
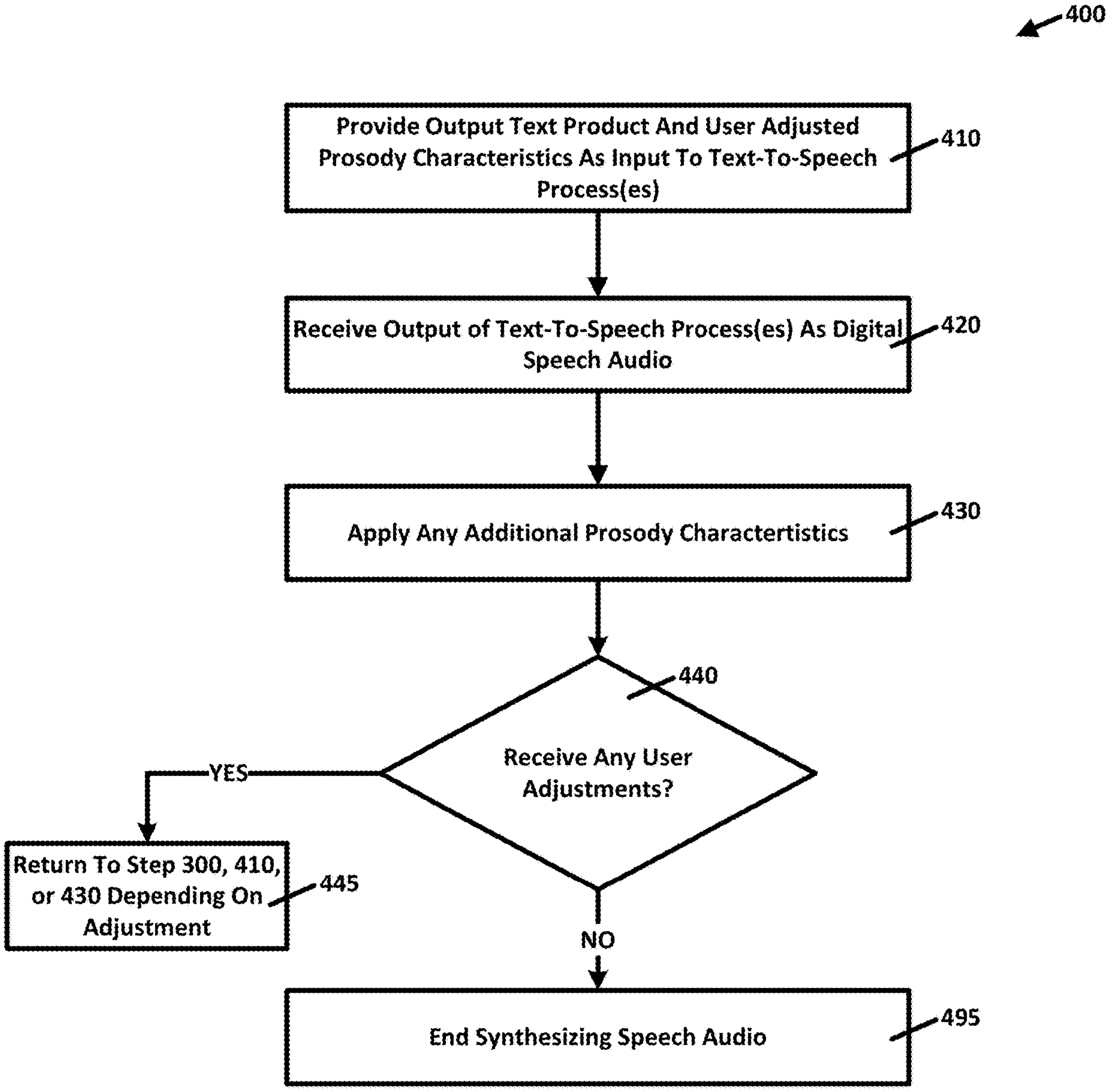
FIG. 5 is a flowchart depicting steps for synthesizing speech audio using the output text product, according to an embodiment.

FIG. 5 is a flowchart depicting steps for synthesizing speech audio using the output text product (step 400), according to an embodiment. In this embodiment, the output text product generated during step 300 is provided, along with user adjusted prosody characteristics, as input to a text-to-speech process (step 410). Inputs to the text-to-speech process include the output text product and its associated prosody characteristics, and prosody settings such as pitch and tempo. As for pitch, a given text-to-speech processor may be able to receive instructions as to whether the text it is to use to synthesize speech is to be synthesized as male or female speech, child or adult speech, a particular accent such as a London accent or a New York City accent, and other factors. Pitch refers to a measure of the average vocal frequency of the speaker. A high pitch is common for women; a low pitch is more common for men. Tempo refers to a measure of the number of speech units or syllables that a given speaker will produce in a period. For example, a higher tempo implies someone 'talks faster'.

Google Inc. of Mountainview, Calif., U.S.A., offers a text to speech processor that is capable of processing text that has been marked up using SSML (Speech Synthesis Markup Language), and offers the option for tags specifying the tempo of speech, for the speech to manifest as male speech or female speech, for breaks or pauses to be inserted, and for pitch, speaking rate, and volume of text to be established in the markup of the text to be inputted into the text to speech processor. Details may be found at https://cloud.google.com/text-to-speech/docs/ssml.

The output of the text-to-speech process is a digital speech audio file or files (step 420), each corresponding to an individual Speaker. In an alternative embodiment, the output of the text-to-speech process is a single digital audio file in which the speech audio of the multiple Speakers have been mixed. After the speech audio has been generated, prosody characteristics that are more appropriately applied to the speech audio itself, such as grit and master volume, are then applied (step 430). In this description, master volume refers to the overall volume of the resulting audio track. Grit refers to a quality of the speaker that can best be described as producing a voice that is raspy or harrowed. Someone with a high grit may sound as though they are older or have been a smoker for many years.

If at this point a user decides an adjustment should be made (step 440) then the process can loop back to any of steps 300, 410 or 430 (step 445) thereby to make the corresponding adjustment to the output text product itself, the inputs to the text-to-speech process without necessarily modifying the output text product itself, and/or the output of the text-to-speech process. In the event the user is not making any further adjustments, synthesizing of the speech audio ends (step 495).

Figure 6:
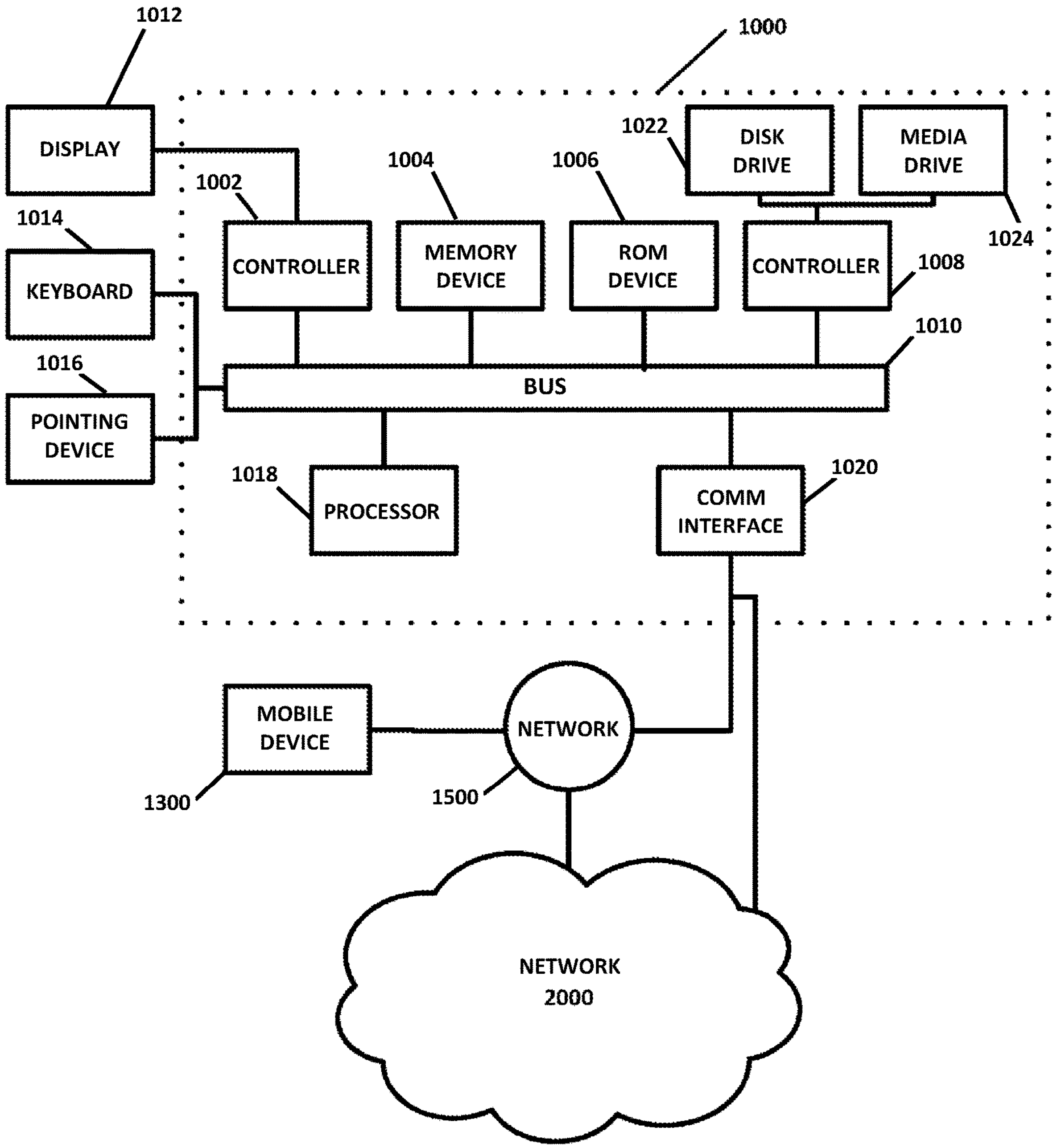
FIG. 6 is a schematic diagram showing a hardware architecture of a computing system suitable as a hardware platform for implementing steps disclosed herein, according to an embodiment.

FIG. 6 is a schematic diagram showing a hardware architecture of a computing system 1000 suitable as a hardware platform for implementing the methods disclosed herein, according to an embodiment. Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display 1012, such as an LED (light emitting diode) screen, organic LED (OLED) screen, liquid crystal display (LCD) screen or some other device suitable for displaying information to a computer user. In embodiments, display controller 1002 incorporates a dedicated graphics-processing unit (GPU) for processing mainly graphics-intensive or other parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application-programming interface (API) such as OpenGL, Direct3D and the like.

Computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry may be used in place of or in combination with software instructions.

As stated above, computing system 1000 includes at least one processor readable medium or memory for holding instructions programmed according to the teachings of the invention and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human. Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different from baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing system may be used to implement the systems and processes described herein.

Electronic data stores implemented in the database described herein may be one or more of a table, an array, a database, a structured data file, an XML file, or some other functional data store, such as hard disk 1022 or removable media 1024.

Figure 7:
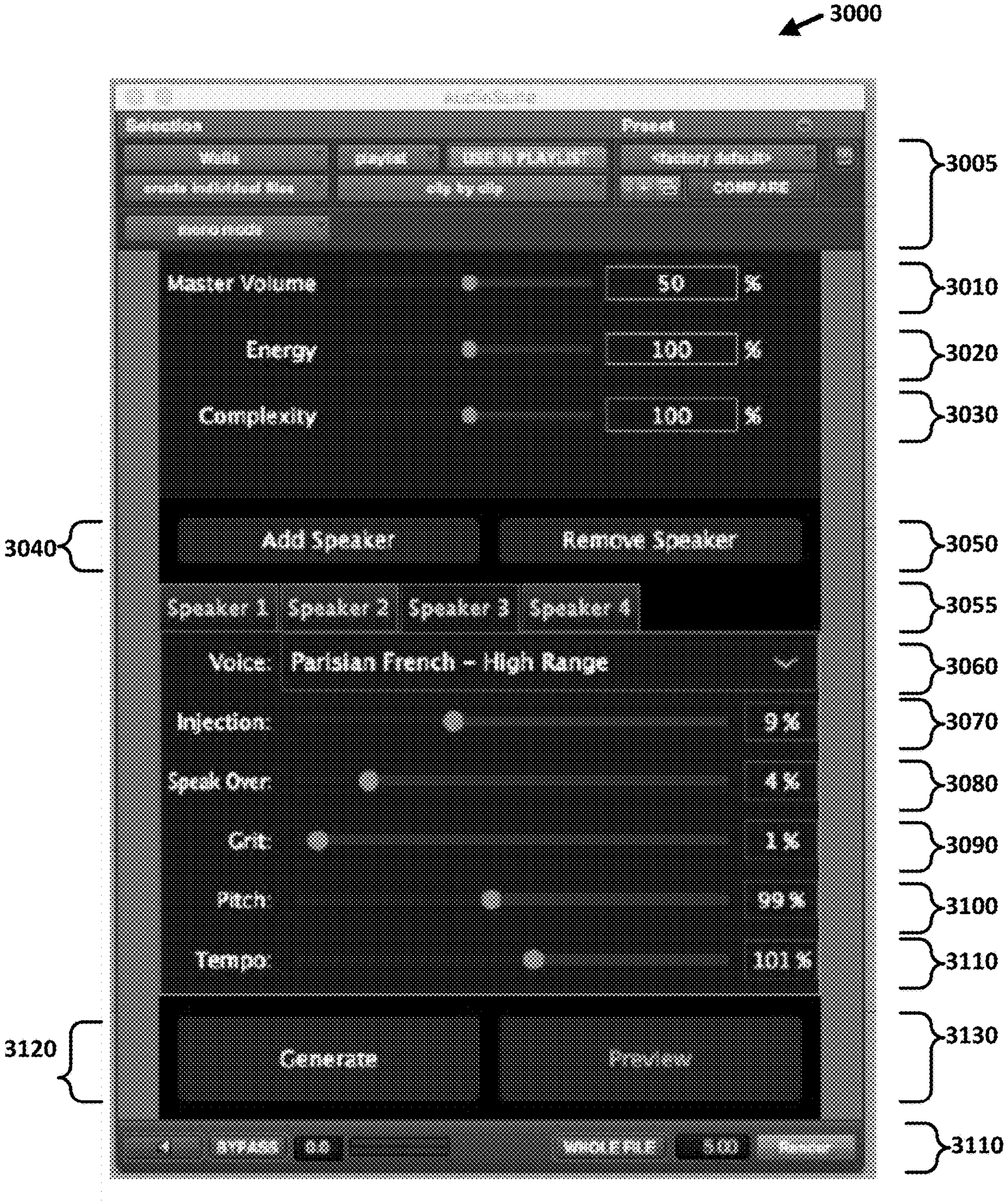
FIG. 7 is a screenshot of a set of user interface components presented as a digital audio workstation (DAW) plugin equipped as described herein to enable a user to select or generate a grammatical profile and to adjust prosody characteristics thereby to synthesize speech audio for use in the DAW.

FIG. 7 is a screenshot of a set of user interface components presented as a digital audio workstation (DAW) plugin 3000 for synthesizing speech audio, according to an embodiment. Plugin 3000 is equipped as described herein to enable a user to select or generate a grammatical profile and to adjust prosody characteristics thereby to synthesize speech audio for use in the DAW. As will be familiar to users of DAWs, plugin 3000 can be invoked as an "insert" on a track or multiple tracks being produced using the DAW. Plugin 3000 provides various user interface controls for establishing settings. Plugin 3000 includes in section 3005, controls for selecting any Presets—combinations of individual settings—with which a user may wish to condition plugin 3000. Section 3005 also includes various DAW settings and dropdowns, for selecting stereo/mono mode, a DAW Compare button, and other controls.

In plugin 3000, a Master Volume setting 3010 enables a user to modify amplification thereby to establish a volume level for a track of speech audio to be synthesized, from 0% to 100%. An Energy setting 3020 enables a user to modify the energy of the speech audio, as described above. A Complexity setting 3030 enables a user to modify the complexity of the speech audio, as described above. An Add Speaker button 3040 is available to increase the number of speakers in the speech audio, and a Remove Speaker button 3050 is available to decrease the number of speakers in the speech audio. These buttons 3040, 3050 can be used to tailor the number of speakers to the particular scene in which the walla is to be used. In this embodiment, the Remove Speaker button 3050 removes the selected tab in the set of speaker tabs 3055, and the Add Speaker button 3040 adds a speaker tab to the end of the set of speaker tabs 3055.

Each speaker is provided with its own set of controls in a respective one of the speaker tabs 3055. In FIG. 7, the speaker tab corresponding to a Speaker 3 is selected. The Voice Setting 3060 enables the user to, using a dropdown box, select from a set of preset voices. In this example, a Parisian French—High Range voice is selected. Selecting the Parisian French—High Range voice will enable plugin 3000 to process an input text of actual Parisian French words (such as a script or some other kind of input text of actual words) to obtain a grammatical profile as a function of the syllable-occurrence rates and syllable-count-per-word rates of the input text of actual Parisian French words. Furthermore, the High Range will enable the syntheses of the speech audio to be done in respect of Speaker 1 in a high range such as that spoken by a woman or a child. Each one of Speakers 1 to 4 can have its speech audio associated with a different input text of actual words and different range.

An Injection control 3070 enables a user to modify the rate of injection by the selected Speaker, and a Speak Over control 3080 enables the user to modify the rate of speakover by the selected Speaker. A Grit control 3090 enables the user to modify the amount of grit in the voice of the selected Speaker, and a Pitch control 3100 enables the user to fine tune the frequency of the speech audio. A Tempo control 3110 enables the user to set the pace of the utterances being produced in the speech audio.

A Generate button 3120 causes the method described herein to execute using the selected input text of actual words, in accordance with the various settings for the loop group as a whole, as well as in accordance with the individual settings for individual Speakers, thereby to synthesize the speech audio. Once the speech audio has been synthesized, it is saved as a .wav or other desired format, and may be played back in isolation by pressing a Preview button 3130, or may be played along with any other tracks in the DAW using standard DAW transport controls. A status and control section 3110 at the bottom of the plugin 3000 provides controls for muting, bypass, and other items.

Figure 8:
FIG. 8 is a screenshot of an open DAW session having several audio tracks, with the plugin depicted in FIG. 7 associated with a selected one of the tracks.
Figure 9:
FIG. 9 is a screenshot of the open DAW session of FIG. 9, with three (3) speech tracks having been populated with respective digital speech synthesized using the plugin, according to an embodiment.

FIG. 8 is a screenshot of an open DAW session having several audio tracks, with plugin 3000 associated with a selected one of the tracks. FIG. 9 is a screenshot of the open DAW session of FIG. 8, with three (3) speech tracks having been populated with respective digital speech synthesized using plugin 3000, according to an embodiment.

Although embodiments have been described with reference to the drawings, those of skill in the art will appreciate that variations and modifications may be made without departing from the spirit, scope and purpose of the invention as defined by the appended claims.

What is claimed is:

1. A computer-implemented method for synthesizing speech audio comprising:

electronically obtaining and storing a digital recording data file containing at least foreground sound;

electronically obtaining and storing an input text of actual words in the form of a computer-readable data file in a digital format;

applying an automatic textual analysis to the input text to electronically generate and store a syllabic profile of the input text, the syllabic profile comprising at least syllable-occurrence rates and syllable-count-per-word rates;

electronically obtaining and storing a grammatical profile of the input text, the grammatical profile comprising at least the syllabic profile;

electronically generating and storing, according to the grammatical profile, a referential digital dictionary of pseudo-words, wherein substantially all of the pseudo-words are not actual words;

electronically constructing, and storing, a digital output text product according to the grammatical profile, the output text product comprising at least one sentence consisting of one or more pseudo-words selected from the dictionary;

using a text-to-speech component, electronically transforming the digital output text product to synthesized background digital speech audio, wherein the synthesized background digital speech audio is thereafter electronically stored; and using a digital audio workstation having a digital audio workstation plugin for synthesizing speech audio, subsequently altering the digital recording data file to include the synthesized background digital speech audio.

2. The method of claim 1, wherein electronically constructing the digital output text product comprises:

constructing multiple sentences each consisting of one or more pseudo-words selected from the dictionary.

3. The method of claim 2, wherein constructing multiple sentences further comprises:

associating each of the multiple sentences with an intended one of a plurality of different speakers.

4. The method of claim 1, wherein the generating comprises:

electronically generating a potential pseudo-word using one or more syllables selected from the syllabic profile;

comparing the potential pseudo-word with actual words in a set of actual words;

in the event that the potential pseudo-word is determined to substantially match one or more of the actual words, discarding the potential pseudo-word; and otherwise:

adding the potential pseudo-word to the dictionary.

5. The method of claim 1, wherein the grammatical profile comprises:

the syllabic profile including the syllables, the syllable-occurrence rates and the syllable-count-per-word rates; and a structural profile of the input text, the structural profile comprising at least one of: word-count-per-sentence rates, sentence type occurrence rates, number of words per sentence, frequency of interjections, and distribution of word length by speaker.

6. The method of claim 1, wherein the syllable-occurrence rates include at least: a frequency of occurrence for each of a plurality of different syllables occurring in the input text.

7. The method of claim 1, wherein the syllable-count-per-word rates include at least: a frequency of monosyllabic words occurring in the input text, a frequency of bisyllabic words occurring in the input text, a frequency of trisyllabic words occurring in the input text, and a frequency of quadrisyllabic words occurring in the input text.

8. The method of claim 1, wherein the syllable-count-per-word rates comprise:

for each of n=1 to x:

a frequency of n-syllable words occurring in the input text;

wherein x>1.

9. The method of claim 8, further comprising:

establishing x as a number of syllables in the highest-syllable count word occurring in the input text.

10. The method of claim 8, wherein the grammatical profile further comprises average distributions of positions of n-syllable words within sentences in the input text.

11. The method of claim 1, wherein the input text comprises at least one film/television script.

12. The method of claim 5, wherein the structural profile is electronically generated and stored during the automatic textual analysis.

13. The method of claim 1, further comprising:

using the digital audio workstation, digitally altering the synthesized background digital speech audio to manifest user-selectable prosody.

14. The method of claim 13, wherein the user-selectable prosody is one or more of the characteristics selected from the group consisting of: energy, complexity, muting, volume, injection, speak over, grit, pitch, intonation, rhythm, and tempo.

15. The method of claim 13, wherein altering the synthesized background digital speech audio to manifest user-selectable prosody comprises:

associating at least one selected prosody characteristic with one or more of the pseudo-words.

16. The method of claim 13, wherein altering the synthesized background digital speech audio to manifest user-selectable prosody comprises:

during electronically transforming the digital output text product to the synthesized background digital speech audio, providing at least one selected prosody characteristic to the text-to-speech component.

17. The method of claim 13, wherein altering the synthesized background digital speech audio to manifest user-selectable prosody comprises:

after electronically transforming the digital output text product to the synthesized background digital speech audio, digitally modifying the synthesized background digital speech audio in accordance with at least one selected prosody characteristic.

18. The method of claim 13, further comprising:

generating and displaying user interface elements at the digital audio workstation that enable a user to select the user-selectable prosody.

19. A non-transitory computer-readable medium embodying a computer program executable on a computer processor for generating synthesized background digital speech audio, the computer program comprising:

computer program code executable to:

electronically obtain and store an input text of actual words in the form of a computer-readable data file in a digital format;

apply an automatic textual analysis to the input text to electronically generate and store a syllabic profile of the input text, the syllabic profile comprising at least syllable-occurrence rates and syllable-count-per-word rates;

electronically obtain and store a grammatical profile of the input text, the grammatical profile comprising at least the syllabic profile;

electronically generate and store, according to the grammatical profile, a referential digital dictionary of pseudo-words, wherein substantially all of the pseudo-words are not actual words;

electronically construct and store a digital output text product according to the grammatical profile, the output text product comprising at least one sentence consisting of one or more pseudo-words selected from the dictionary;

using a text-to-speech component, electronically transform the digital output text product to synthesized background digital speech audio, wherein the synthesized background digital speech audio is thereafter electronically stored; and using a digital audio workstation, subsequently digitally alter a pre-recorded digital recording data file containing at least foreground sound to include the synthesized background digital speech audio in the form of a walla component.

20. A system for generating synthesized background digital speech audio, the system comprising at least one computer processor configured to:

electronically obtain and store a digital recording data file containing at least foreground sound;

electronically obtain and store an input text of actual words in the form of a computer-readable data file in a digital format;

electronically apply an automatic textual analysis to the input text to electronically generate and store a syllabic profile of the input text, the syllabic profile comprising at least syllable-occurrence rates and syllable-count-per-word rates;

electronically obtain and store a grammatical profile of the input text, the grammatical profile comprising at least the syllabic profile;

electronically generate and store, according to the grammatical profile, a referential digital dictionary of pseudo-words, wherein substantially all of the pseudo-words are not actual words;

electronically construct, and store, a digital output text product according to the grammatical profile, the output text product comprising at least one sentence consisting of one or more pseudo-words selected from the dictionary;

using a text-to-speech component, electronically transform the digital output text product to a synthesized background digital speech audio, wherein the synthesized background digital speech audio is thereafter electronically stored; and using a digital audio workstation, subsequently altering the digital recording data file to include the synthesized background digital speech audio in the form of a walla component.

* * * * *